(12) United States Patent
Lin et al.

(10) Patent No.: US 11,539,734 B1
(45) Date of Patent: Dec. 27, 2022

(54) EXPOSURE DETECTION BY SCAN TELEMETRY

(71) Applicant: Rapid7, Inc., Boston, MA (US)

(72) Inventors: Wah-Kwan Lin, Melrose, MA (US); Paul Deardorff, Durham, NC (US)

(73) Assignee: Rapid7, Inc., Boston, MA (US)

( * ) Notice: Subject to any disclaimer, the term of this patent is extended or adjusted under 35 U.S.C. 154(b) by 424 days.

(21) Appl. No.: 16/723,050

(22) Filed: Dec. 20, 2019

(51) Int. Cl.
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/1466* (2013.01); *H04L 63/1483* (2013.01)

(58) Field of Classification Search
CPC ............. H04L 63/1433; H04L 63/1416; H04L 63/1425; H04L 63/1466; H04L 63/1483
See application file for complete search history.

(56) References Cited

U.S. PATENT DOCUMENTS

| | | | | |
|---|---|---|---|---|
| 10,546,135 | B1* | 1/2020 | Kassoumeh | ....... G06Q 10/0635 |
| 11,283,826 | B2* | 3/2022 | Henderson | .......... H04L 63/1433 |
| 2005/0243730 | A1* | 11/2005 | Williamson | ........ H04L 63/1433 |
| | | | | 370/389 |
| 2016/0014126 | A1* | 1/2016 | Jalan | ................... H04L 63/0892 |
| | | | | 726/7 |
| 2016/0248800 | A1* | 8/2016 | Ng | .......................... G06Q 40/06 |
| 2019/0278928 | A1* | 9/2019 | Rungta | ................. G06F 9/5077 |
| 2020/0287927 | A1* | 9/2020 | Zadeh | .................... H04L 61/45 |

FOREIGN PATENT DOCUMENTS

| | | | | |
|---|---|---|---|---|
| EP | 1592199 | A1 * | 11/2005 | ............. H04L 41/28 |
| GB | 2544309 | A   * | 5/2017 | ......... H04L 63/1416 |

* cited by examiner

*Primary Examiner* — Farid Homayounmehr
*Assistant Examiner* — Mudasiru K Olaegbe
(74) *Attorney, Agent, or Firm* — Ashwin Anand; Lei Sun

(57) ABSTRACT

Methods and systems for identifying a vulnerability on a network are disclosed. The methods described herein may involve executing a first scanning function to obtain a first view of a network and then filtering the first view of the network for at least one point of exposure of a first entity that originates from a second entity. The methods described herein may further involve executing a secondary scanning function to identify any vulnerabilities of the first entity based on the point of exposure of the first entity that originates from the second entity and implementing a threat prevention procedure upon identifying a vulnerability of the first entity based on the point of exposure of the first entity that originates from the second entity.

19 Claims, 5 Drawing Sheets

EXPOSURE DETECTION BY SCAN TELEMETRY

TECHNICAL FIELD

Embodiments described herein relate to methods and systems for identifying vulnerabilities and, more particularly but not exclusively, to methods and systems for identifying vulnerabilities due to external points of exposure.

BACKGROUND

Due to their prevalence in today's society, the internet and other types of networks have become a hub for criminal activity. Often times cyber-criminals or other threat actors attempt to install or otherwise deploy harmful applications on unprotected systems. Once a threat actor obtains access to a targeted system or device, they may perform further actions such as stealing data, escalating their privileges, or the like.

Recognizing and prioritizing network assets that are at risk is becoming increasingly difficult as the amounts of vulnerabilities, malware, and exploits continue to rise. For example, every year the number of CVEs (common vulnerabilities and exposures) increases, as does the number of general software products.

Existing vulnerability detection techniques do not scale well with the ever-increasing amount of threats. Additionally, these existing techniques are inherently reactive in nature, and only recognize that an asset is infected with malware or the subject of malicious activity after the fact.

Routine activities of organizations often expose them to these types of vulnerabilities. For example, organizations routinely leverage third-party technologies and services and can, in many cases, deeply integrate systems and processes from outside vendors. Depending on how these vendors operate, such integrations may introduce points of exposure and vulnerabilities to the organization.

As the points of exposure and vulnerabilities may reside on third party systems (which may be granted privileged access to confidential data or systems associated with the organization), they are often undetectable by conventional vulnerability management or detection techniques. That is, response programs that have an internal viewpoint are mainly configured to identify weaknesses in systems owned by an organization, and not those associated with outside systems or vendors.

A need exists, therefore, for systems and methods that identify these potential vulnerabilities.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying a vulnerability on a network. The method includes executing a first scanning function to obtain a first view of a network, filtering the first view of the network for at least one point of exposure of a first entity that originates from a second entity, executing a secondary scanning function to identify any vulnerabilities of the first entity based on the point of exposure of the first entity that originates from the second entity, and implementing a threat prevention procedure upon identifying a vulnerability of the first entity based on the point of exposure of the first entity that originates from the second entity.

In some embodiments, the secondary scanning function identifies at least one of an IP address, a port, a protocol, a service, and an autonomous system associated with the first entity that is exposed by the second entity.

In some embodiments, executing the first scanning function includes executing an examination of Domain Name System (DNS) records.

In some embodiments, filtering the first view of the network includes enumerating a plurality of terms specific to the first entity, and searching the first view of the network for instances of the enumerated plurality of terms on a network of the second entity. In some embodiments, filtering the first view of the network includes identifying an enumerated term in a hostname. In some embodiments, the method further includes dismissing an enumerated term identified in a primary hostname.

In some embodiments, the method further includes elevating the identified vulnerability to an operator for analysis via a user interface.

In some embodiments, the first view of the network includes publicly available data regarding the point of exposure of the first entity on the network.

In some embodiments, executing the secondary scanning function to identify any vulnerabilities of the first entity based on the point of exposure of the first entity includes identifying a vulnerability of the first entity that is not under control by the first entity.

According to another aspect, embodiments relate to a system for identifying a vulnerability on a network. The system includes a processor executing instructions stored on memory configured to execute a first scanning function to obtain a first view of a network, filter the first view of the network for at least one point of exposure of a first entity that originates from a second entity, execute a secondary scanning function to identify any vulnerabilities of the first entity based on the point of exposure of the first entity that originates from the second entity, and implement a threat prevention procedure upon identifying a vulnerability of the first entity based on the point of exposure of the first entity that originates from the second entity.

In some embodiments, the secondary scanning function identifies at least one of an IP address, a port, a protocol, a service, and an autonomous system associated with the first entity that is exposed by the second entity.

In some embodiments, the processor executes the first scanning function by executing an examination of Domain Name System (DNS) records.

In some embodiments, the processor filters the first view of the network by enumerating a plurality of terms specific to the first entity and searching the first view of the network for instances of the enumerated plurality of terms on a network of the second entity. In some embodiments, the processor is configured to filter the first view of the network by identifying an enumerated term in a hostname. In some embodiments, the processor is further configured to dismiss an enumerated term identified in a primary hostname.

In some embodiments, the processor is further configured to elevate the identified vulnerability to an operator for analysis via a user interface.

In some embodiments, the first view includes publicly available data regarding the point of exposure of the first entity on the network.

In some embodiments, the processor executes the secondary scanning function by identifying a vulnerability of the first entity that is not under control by the first entity.

According to yet another aspect, embodiments relate to a method for identifying a vulnerability on a network. The method includes executing a Domain Name System (DNS) scan of a first portion of the internet to obtain a first view of the internet; filtering the first view of the internet for at least one point of exposure of a first entity by enumerating a plurality of terms specific to the first entity and searching the first view of the internet for instances of the enumerated plurality of terms; executing a secondary scanning function to identify any vulnerabilities of the first entity based on the point of exposure, wherein the secondary scanning function identifies at least one of an IP address, a port, a protocol, a service, and an autonomous system associated with the first entity; and implementing a threat prevention procedure upon identifying a vulnerability of the first entity based on the point of exposure of the first entity.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

As discussed previously, organizations are often exposed to vulnerabilities due to their use of outside technologies or services. These points of exposure may be through resources or network endpoints that are not owned or otherwise under control of the organization.

For example, services such as GitHub, NetSuite, Salesforce.com, or other web-based services frequently host tools or resources provided by other entities. While these services may not necessarily be guilty of any wrongdoing, threat actors may leverage these points of exposure to perform malicious actions.

Threat actors may view these points of exposure as representing rich sources of intelligence that can bolster their capabilities and effectiveness. For example, threat actors may learn about organizations and then devise and implement phishing campaigns against employees of the organization.

The systems and methods described herein may identify these points of exposure by scanning the internet or other type of network at large (for simplicity, "internet") to collect a public exposure view or otherwise a first view of the internet. With this telemetry, the systems and methods may then filter relevant findings down to the organization level. By doing so, the disclosed embodiments not only identify points of exposure from within an organization, but also identify points of exposure related to the organization that originate from third parties. The systems and methods described herein may then gather data regarding how these points of exposure are being used.

Accordingly, the systems and methods described herein leverage scan telemetry to identify vulnerabilities that cannot otherwise be addressed by conventional vulnerability management, detection, and response solutions. Conventional approaches operate with an internal orientation in which assets and resources owned by an organization are the focus. The systems and methods described herein, on the other hand, operate with an external orientation in which the view is directed to the public internet at large.

Figure 1:
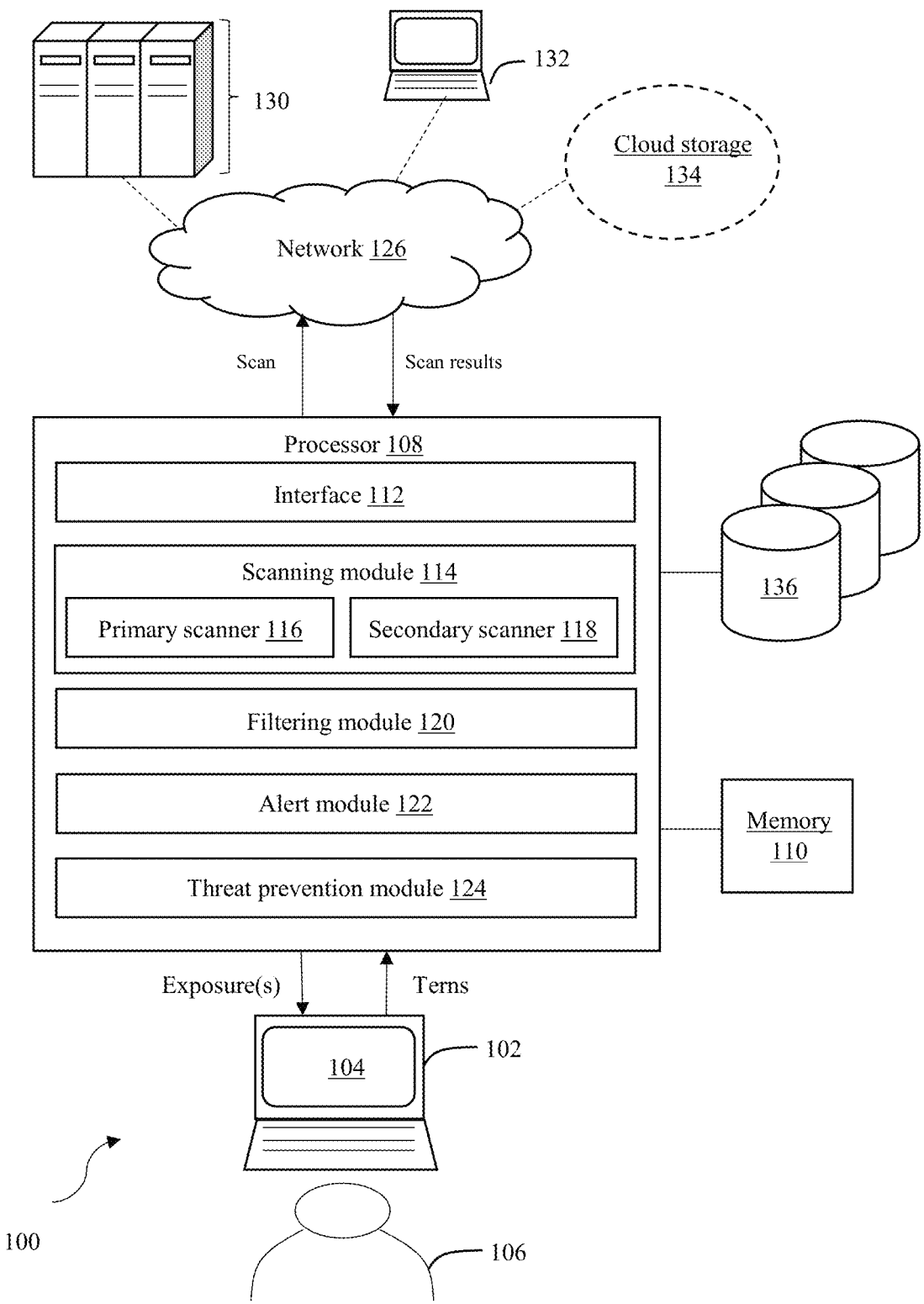
FIG. 1 illustrates a system for identifying a vulnerability on a network in accordance with one embodiment.

FIG. 1 illustrates a system 100 for identifying a vulnerability on a network in accordance with one embodiment. The system 100 may include one or more user devices 102 executing a user interface 104 for presentation to a user 106. The user 106 may be a network administrator of an organization or otherwise someone interested in monitoring the security of an organization's network. In this case, the user 106 may be interested in determining points of exposure of an organization that arise from vendors or entities not associated with the organization.

In the context of the present application, the term "organization" or "entity" may refer to a corporation, a partnership, a business entity, a non-profit organization, a government entity, an administrative body, an educational institution, or any other type of entity that may be associated with a network.

The user device 102 may be in operable communication with one or more processors 108. The processor(s) 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, a scanning module 114 with a primary scanner 116 and a secondary scanner 118, a filtering module 120, an alert module 122, and a threat prevention module 124.

In operation, the scanning module 114 and, more particularly, the primary scanner 116 may scan a network 126 such as the internet at large to determine which resources 130, 132, and 134 that are located on or accessible through the network 126 could be exposing vulnerabilities of the organization. In some embodiments, the primary scanner 116 may execute a DNS scan of the internet (i.e., by examining DNS records).

The resources 130, 132, and 134 may include servers, devices, storages, or the like, that are associated with various other parties. For example, the resources 130-34 may be associated with vendors, customers, or other entities that an organization may have hired to perform some task(s). Additionally or alternatively, one or more of the resources 130-34 may have no preexisting relationship or contractual obligations with respect to the organization.

The network(s) 126 may link the various assets and components with various types of network connections. The network(s) 126 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 126 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The interface 112 may receive results of the primary scanner 116 over the network(s) 126. These results may include DNS records, for example.

The filtering module 120 may then enumerate a set of terms specific to the organization. These enumerated terms may include organization names, subsidiaries, organization-specific technologies, organization-specific services, or the like.

These terms may be generated autonomously based on data stored in one or more databases 136. For example, the database(s) 136 may store records of an organization that include terms specific to that organization. The processor 108 may also receive feedback from the user 106 regarding enumerated terms. The user 106 may review a provided set of enumerated terms for accuracy and completeness, and revise the set of enumerated terms as necessary.

The filtering module 120 may then filter the results from the primary scanner 116 for the enumerated terms. Specifically, the filtering module 120 may filter results for enumerated terms in hostnames in the results. However, the filtering module 120 may specifically exclude the presence of the enumerated terms in primary domains or otherwise expected domains. For example, if the organization were Rapid7, Inc., the filtering module 120 may exclude "rapid7.com" from being returned. This is because the organization (i.e., Rapid7, Inc.) would likely be well aware of this domain and any vulnerabilities associated therewith.

Accordingly, by filtering results such as those from a DNS search, the systems and methods described herein may identify cases where an organization's use of an external service may be revealed. For example, a search related to Rapid7, Inc. and its subsidiaries may reveal the presence of logentries.zendesk.com, rapid7.github.io, rapid7-com.mail-protection.outlook.com and so on.

Figure 2:
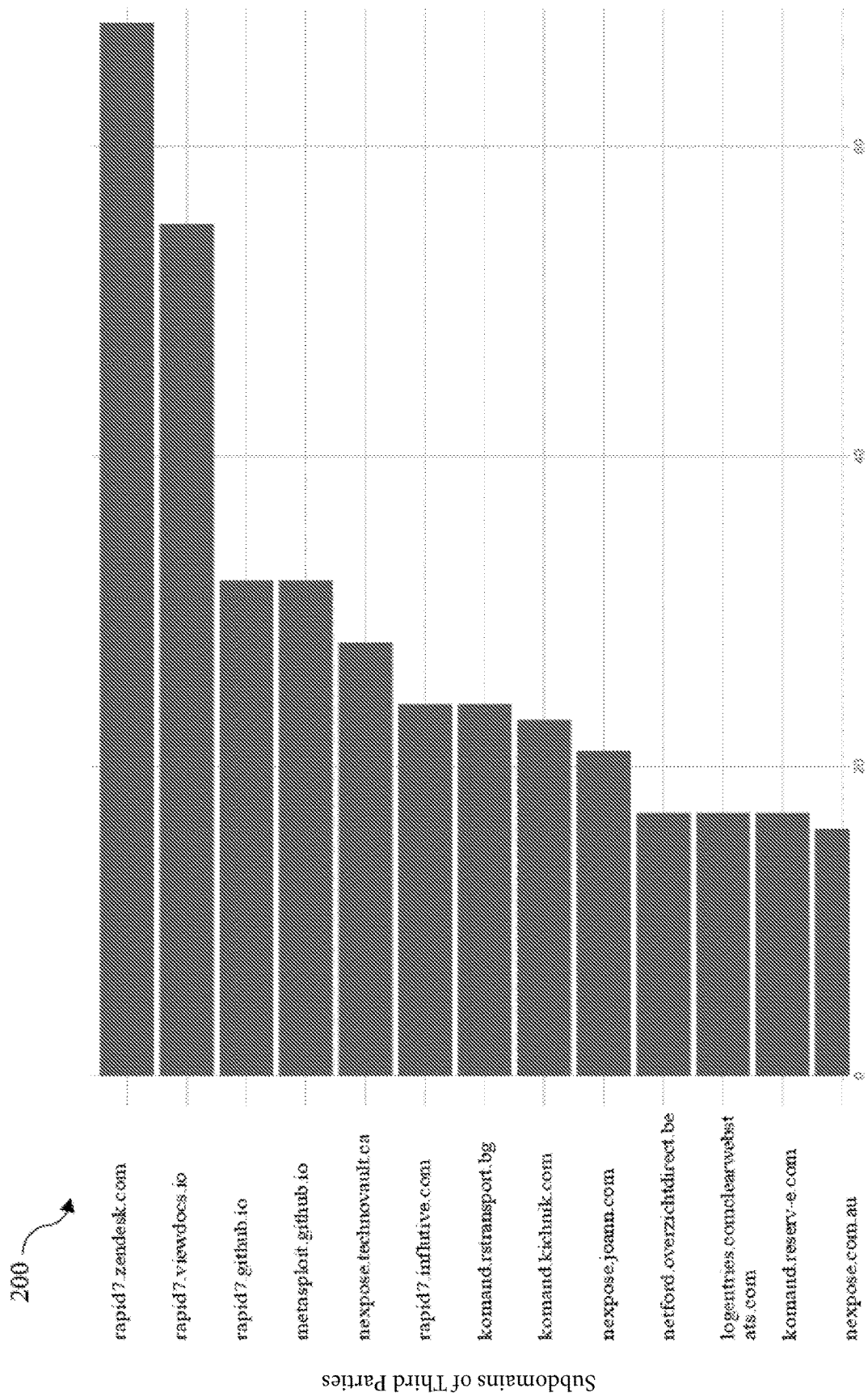
FIG. 2 illustrates a bar graph showing results of a filtering procedure in accordance with one embodiment.

FIG. 2 illustrates a results bar graph 200 that shows results of the filtering procedure. The horizontal axis represents the number of assets discovered, and the vertical assets represent subdomains of third parties. Specifically, the vertical axis indicates a set of enumerated terms associated with the organization Rapid7, Inc., i.e., Rapid7, Logentries, Komand, Nexpose, etc.

In this case, the user 106 would see that there are over 60 instances in which Zendesk is exposing resources associated with Rapid7, Inc. The user 106 may be unaware of this exposure, or at the very least unaware of the number of assets that are exposed.

While the set of hostnames identified may not necessarily qualify as points of exposure that should give rise to concern, such external orientation for intelligence collection enables a variety of benefits. These may include, but are not limited to, the possibility of identifying undesirable configurations, possible exposures, attempts by malicious actors to mimic an organization, or the like.

The secondary scanner 118 may then perform another set of scans on these filtered results. This secondary scanning procedure may identify IPs, ports, protocols, services, autonomous systems, or the like. The filtering module 120 may then filter the results of this secondary scan based on the previous set of enumerated terms. The filtered set should therefore expose instances of ports, protocols, services, and autonomous systems that are owned and operated by third party services, but also represent points of exposure for the original organization.

Accordingly, this secondary scan may detect how other entities are using the organization's resources or tools. By leveraging the details extracted from identified hostnames, the systems and methods described herein may identify particular services that may undesirably be exposed. For example, the systems and methods described herein may find that a service provider is operating file transfer protocol (FTP) or telnet servers for the organization. Depending on what these services are intended for or how they are configured, they may qualify as points of vulnerability.

The data captured in conjunction with the above-described scanning attempts is publicly available. In theory, therefore, any data detected by the above scanning procedures can also be detected by threat actors. These threat actors may leverage this data by, for example, devising a phishing campaign against the organization's employees. Accordingly, these exposures or vulnerabilities may represent rich sources of intelligence that can bolster the capabilities of threat actors and the effectiveness of their malicious actions.

Figure 3A:
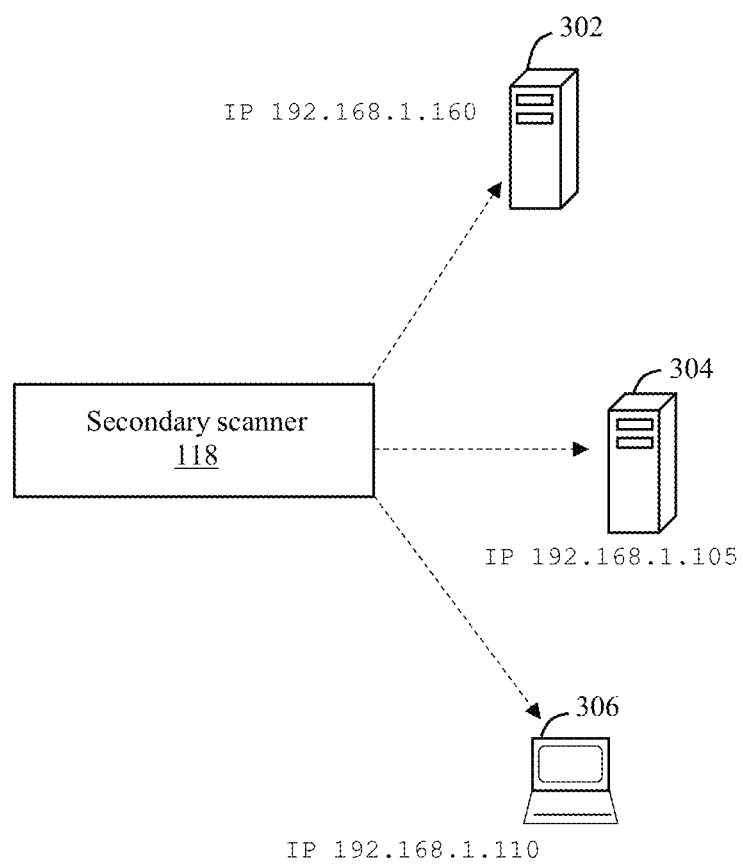
FIGS. 3A & B depict a scanning procedure in accordance with one embodiment.

FIG. 3A illustrates the secondary scanner 118 of FIG. 1 performing the secondary scans of domains 302, 304, and 306. Domain 302 corresponds to IP address 192.168.1.160, domain 304 corresponds to IP address 192.168.1.105, and domain 306 corresponds to IP address 192.168.1.110. These IP addresses may correspond to the assets identified in the graph 200 of FIG. 2, for example. Accordingly, the secondary scanner 118 may scan these assets to determine how they are configured or otherwise how they are being used.

Figure 3B:
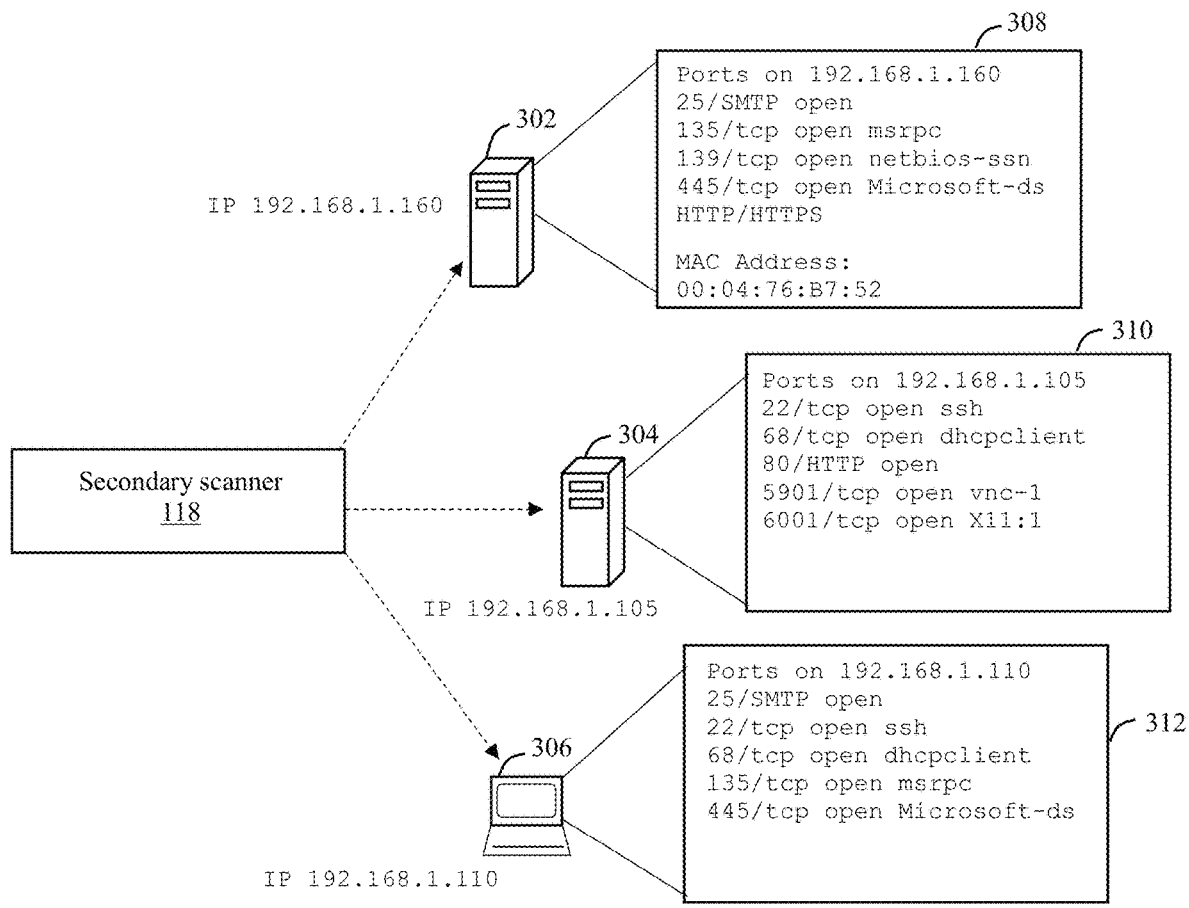

As seen in FIG. 3B, the secondary scanner 118 may return results 308 corresponding to domain 302, results 310 corresponding to domain 304, and results 312 corresponding to domain 306. These results 308-12 may provide insight regarding which ports are open on the domains and which processes or services are executing thereon. The ports that are open and the types of services executing on a domain may provide valuable information regarding how the domains are being used.

For example, and as seen in FIG. 3B, results 308 and 312 indicate that domains 302 and 306, respectively, each have port 25 open. Port 25 is designated for the Simple Mail Transfer Protocol (SMTP), which is used for routing emails between network locations. Accordingly, the results 308 and 312 may indicate that these domains are likely being used for communicating emails. This may concern the user 106 or the organization, as these domains may be sending emails that are designed to at least appear to be associated with the organization.

Upon detecting one or more of these types of exposures, the alert module 122 may communicate an alert to the user 106. The alert may be a visual-based alert, an audio-based alert, a text-based alert, a haptic-based alert, or some combination thereof. The user interface 104 may present the user 106 with data in an easy-to-read format, such as with the graph 200 of FIG. 2. The user 106 may then investigate the cause of the alert, as well as inspect any of the noted exposures and determine whether additional action is appropriate.

Additionally or alternatively, the threat prevention module 124 may autonomously execute any one or more of threat prevention measures, threat mitigation measures, or the like. For example, the threat prevention module 124 may display potential risks associated with these other entities in an easy-to-understand fashion, issue notifications to the entities responsible for the exposure, or the like.

Figure 4:
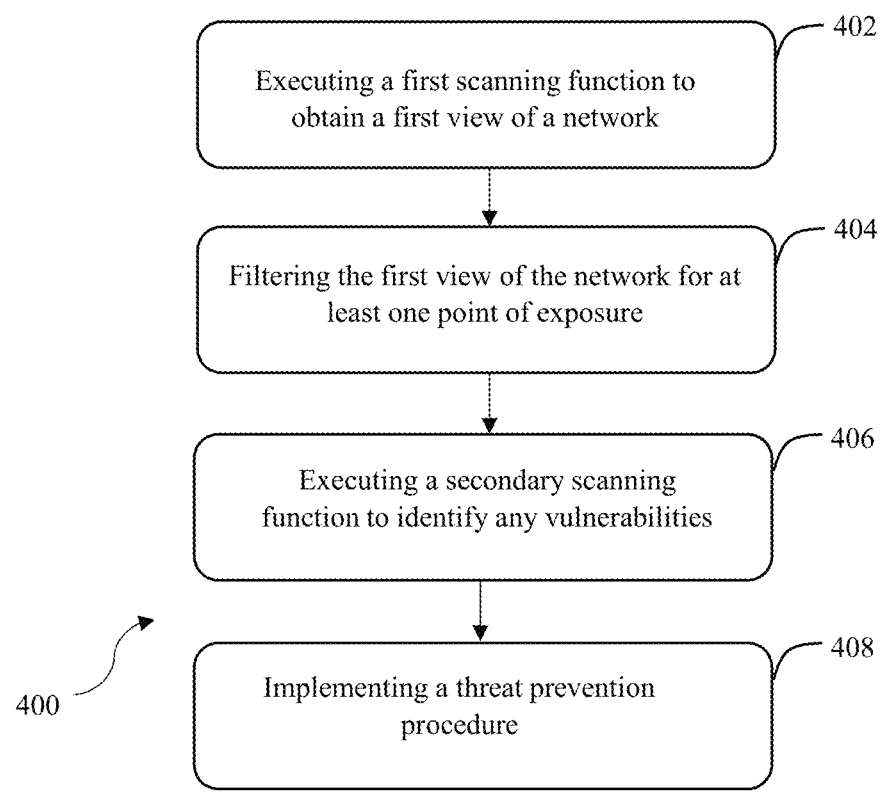
FIG. 4 depicts a flowchart of a method for identifying a vulnerability in accordance with one embodiment.

FIG. 4 depicts a flowchart of a method 400 for identifying a vulnerability on a network in accordance with one embodiment. The system 100 of FIG. 1 or the components thereof may perform the steps of method 400.

Step 402 involves executing a first scanning function to obtain a first view of a network. The primary scanner 116 of FIG. 1 may perform this step, for example. In some embodiments, this first scanning function involves executing an examination of DNS records.

Step 404 involves filtering the first view of the network for at least one point of exposure of a first entity that originates from a second entity. The filtering module 120 of FIG. 1 may perform this step. In some embodiments, the second entity may be a business entity that is not owned or is not a subsidiary of the first entity.

In some embodiments, this filtering step may first involve enumerating a plurality of terms specific to the first entity. These enumerated terms may include organization names, subsidiaries, organization-specific technologies, organization-specific services, or the like. These terms may be generated autonomously based on data stored in one or more databases 138.

Step 404 may then involve searching the first view of the network for instances of the enumerated plurality of terms on a network of the second entity. This step may therefore dismiss or otherwise filter domains that may not be of interest to the first entity.

Step 406 involves executing a secondary scanning function to identify any vulnerabilities of the first entity based on the point of exposure of the first entity that originates from a second entity. The secondary scanner 118 of FIG. 1 may perform this step.

In some embodiments, this secondary scanning function identifies at least one of an IP address, a port, a protocol, a service, and an autonomous system associated with the first entity that is exposed by the second entity. Accordingly, the systems and methods may gather data regarding how assets that could be exposing the first entity are configured and how they are being used.

Step 408 involves implementing a threat prevention procedure upon identifying a vulnerability of the first entity based on the point of exposure of the first entity that originates from a second entity. A threat prevention procedure may include issuing an alert to a user informing them of the exposed vulnerability, issuing a message or instruction to the second entity, or the like.

Various embodiments are described with reference to the accompanying drawings, which form a part hereof, and which show specific exemplary embodiments. However, the concepts of the present disclosure may be implemented in many different forms and should not be construed as limited to the embodiments described herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The previous detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the previous disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the preceding description are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the previous discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the preceding description. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
    executing a first scanning function to obtain a first view of a network;
    filtering the first view of the network for at least one point of exposure of a first entity that originates from a second entity, wherein the point of exposure includes a resource or network endpoint of the second entity that is not owned or controlled by the first entity, and the filtering is performed using a plurality of terms specific to the first entity including one or more organization names, organization-specific technology names, or organization-specific service names associated with the first entity;
    executing a secondary scanning function to identify vulnerabilities of the first entity based on the point of exposure of the first entity that originates from a second entity; and
    implementing a threat prevention procedure upon identifying a vulnerability of the first entity based on the point of exposure of the first entity that originates from a second entity.

2. The method of claim 1 wherein the secondary scanning function identifies at least one of an IP address, a port, a protocol, a service, and an autonomous system associated with the first entity that is exposed by the second entity.

3. The method of claim 1 wherein executing the first scanning function includes executing a DNS scan of a portion of the internet.

4. The method of claim 1 wherein filtering the first view of the network includes:
    searching the first view of the network for instances of the plurality of terms.

5. The method of claim 4 wherein filtering the first view of the network includes identifying an enumerated term in a hostname.

6. The method of claim 5 further comprising dismissing an enumerated term identified in a primary hostname.

7. The method of claim 1 further comprising elevating the identified vulnerability to an operator for analysis via a user interface.

8. The method of claim 1 wherein the first view of the network includes publicly available data regarding the point of exposure of the first entity on the network.

9. The method of claim 1 wherein executing the secondary scanning function to identify any vulnerabilities of the first entity based on the point of exposure of the first entity includes identifying a vulnerability of the first entity that is not under control by the first entity.

10. A system comprising:
one or more a processors executing instructions stored on memory configured to:
execute a first scanning function to obtain a first view of a network;
filter the first view of the network for at least one point of exposure of a first entity that originates from a second entity, wherein the point of exposure includes a resource or network endpoint of the second entity that is not owned or controlled by the first entity, and the filtering is performed using a plurality of terms specific to the first entity including one or more organization names, organization-specific technology names, or organization-specific service names associated with the first entity;
execute a secondary scanning function to identify vulnerabilities of the first entity based on the point of exposure of the first entity that originates from the second entity; and
implement a threat prevention procedure upon identifying a vulnerability of the first entity based on the point of exposure of the first entity that originates from a second entity.

11. The system of claim 10 wherein the secondary scanning function identifies at least one of an IP address, a port, a protocol, a service, and an autonomous system associated with the first entity that is exposed by the second entity.

12. The system of claim 10 wherein the processor executes the first scanning function by executing a DNS scan of a portion of the internet.

13. The system of claim 10 wherein the processor filters the first view of the network by:
searching the first view of the network for instances of the enumerated plurality of terms.

14. The system of claim 13 wherein the processor is configured to filter the first view of the network by identifying an enumerated term in a hostname.

15. The system of claim 14 wherein the processor is further configured to dismiss an enumerated term identified in a primary hostname.

16. The system of claim 10 wherein the processor is further configured to elevate the identified vulnerability to an operator for analysis via a user interface.

17. The system of claim 10 wherein the first view includes publicly available data regarding the point of exposure of the first entity on the network.

18. The system of claim 10 wherein the processor executes the secondary scanning function by identifying a vulnerability of the first entity that is not under control by the first entity.

19. A method comprising:
executing a DNS scan of a first portion of the internet to obtain a first view of the internet;
filtering the first view of the internet for at least one point of exposure of a first entity by enumerating a plurality of terms specific to the first entity and searching the first view of the internet for instances of the enumerated plurality of terms, wherein the point of exposure includes a resource or network endpoint of a second entity that is not owned or controlled by the first entity, and the plurality of terms includes names specific to the first entity including one or more organization names, organization-specific technology names, or organization-specific service names associated with the first entity;
executing a secondary scanning function to identify vulnerabilities of the first entity based on the point of exposure, wherein the secondary scanning function identifies at least one of an IP address, a port, a protocol, a service, and an autonomous system associated with the first entity; and
implementing a threat prevention procedure upon identifying a vulnerability of the first entity based on the point of exposure of the first entity.

* * * * *